(12) United States Patent
Zaiser et al.

(10) Patent No.: US 9,283,629 B2
(45) Date of Patent: Mar. 15, 2016

(54) HANDHELD POWER SAW (75) Inventors: Adolf Zaiser, Koengen (DE); Juergen Wiker, Leinfelden-Echterdingen (DE); Wolfgang Hirschberger, Thurston (GB); Joerg Albrecht, Wolfschlugen (DE); Rudolf Fuchs, Neuhausen (DE); Juergen Stoeger, Neckartaifingen (DE); Violaine Holtzmann, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 1910 days.

(21) Appl. No.: 10/587,686

(22) PCT Filed: Jan. 3, 2006

(86) PCT No.: PCT/EP2006/050024
§ 371 (c)(1),
(2), (4) Date: Jul. 27, 2006

(87) PCT Pub. No.: WO2006/092340
PCT Pub. Date: Sep. 8, 2006

(65) Prior Publication Data
US 2009/0044416 A1 Feb. 19, 2009

(30) Foreign Application Priority Data

Mar. 2, 2005 (DE) .......................... 10 2005 009 467

(51) Int. Cl.
*B23D 49/16* (2006.01)
*B23D 51/10* (2006.01)
(Continued)

(52) U.S. Cl.
CPC .............. *B23D 51/10* (2013.01); *B23D 49/167* (2013.01); *B23D 51/025* (2013.01);
(Continued)

(58) Field of Classification Search
CPC .... B23D 49/167; B23D 51/025; B23D 51/10; B23D 61/123; B23D 61/125; B23D 61/128; B26D 7/00; A61B 17/14; A61B 17/141; A61B 17/148; Y10T 83/9454; Y10T 83/9481
USPC .................. 30/392–394, 329, 340, 342, 351; 83/699.21, 697
See application file for complete search history.

(56) References Cited

U.S. PATENT DOCUMENTS 1,481,055 A * 1/1924 Fullbright .......... B23D 57/0076
30/144
1,838,125 A 12/1931 Wirtz
(Continued)

FOREIGN PATENT DOCUMENTS

DE 26 57 665 6/1978
DE 35 09 515 9/1986
(Continued)

*Primary Examiner* — Clark F Dexter
(74) *Attorney, Agent, or Firm* — Michael J. Striker (57) ABSTRACT The handheld power saw includes a drive mechanism with a lifting rod; a saw blade with an elongated recess in a guide region thereof and a retaining region with a T-shaped extension; a coupling device for retaining and driving the saw blade located on the lifting rod, which includes a clamping sleeve configured to receive the T-shaped extension to connect the saw blade to the lifting rod; a guide assembly for guiding oscillatory motion of the saw blade, which includes two lateral bracing devices arranged on opposite sides of the saw blade that shield the coupling device from shear forces; a pressure roller supported on a bolt, which is arranged to bear on an edge of the saw blade and a pressure bolt arranged in the elongated recess to directly guide the saw blade.

12 Claims, 7 Drawing Sheets

(51) Int. Cl.
*B23D 61/12* (2006.01)
*B23D 51/02* (2006.01)

(52) U.S. Cl.
CPC ........... *B23D 61/123* (2013.01); *B23D 61/125* (2013.01); *B23D 61/128* (2013.01); *Y10T 83/9454* (2015.04); *Y10T 83/9481* (2015.04)

(56) References Cited

U.S. PATENT DOCUMENTS

| | | | | |
|---|---|---|---|---|
| 3,033,251 | A * | 5/1962 | Atkinson et al. | B23D 61/126 30/353 |
| 3,155,128 | A * | 11/1964 | Godfrey et al. | 83/748 |
| 3,270,369 | A | 9/1966 | Mandell | |
| 3,555,678 | A * | 1/1971 | Agulnick et al. | B23D 49/162 30/279.6 |
| 3,573,857 | A * | 4/1971 | Sederberg | B23D 49/08 30/355 |
| 3,977,289 | A * | 8/1976 | Tuke | A61B 17/14 30/392 |
| 4,114,270 | A | 9/1978 | Jansen-Herfeld et al. | |
| 4,294,013 | A * | 10/1981 | Krieg | B23D 51/10 30/392 |
| 4,419,904 | A * | 12/1983 | Albury | 74/44 |
| 4,656,742 | A * | 4/1987 | Wagner | 30/372 |
| 4,676,001 | A * | 6/1987 | Wagner | 30/393 |
| 4,953,301 | A | 9/1990 | Dobbs, Jr. | |
| 5,535,520 | A | 7/1996 | Armstrong | |
| 5,644,847 | A * | 7/1997 | Odendahl et al. | 30/394 |
| 5,819,420 | A | 10/1998 | Collins | |
| 5,946,810 | A | 9/1999 | Hoelderlin et al. | |
| 6,920,694 | B2 | 7/2005 | Hecht et al. | |
| 2002/0059732 | A1 | 5/2002 | Campbell et al. | |
| 2003/0145472 | A1 | 8/2003 | Swift | |
| 2004/0040162 | A1 * | 3/2004 | Osada | 30/393 |

FOREIGN PATENT DOCUMENTS

| | | |
|---|---|---|
| DE | 195 09 539 | 9/1996 |
| DE | 298 18 217 | 2/2000 |
| DE | 100 34 681 | 1/2001 |
| DE | 100 45 890 | 4/2002 |
| DE | 101 23 440 | 11/2002 |
| EP | 0 603 552 | 6/1994 |
| FR | 2 248 908 | 5/1975 |
| GB | 2 180 791 | 4/1987 |
| GB | 2 380 706 | 4/2003 |

* cited by examiner

HANDHELD POWER SAW

CROSS-REFERENCE TO RELATED APPLICATION

The invention described and claimed hereinbelow is also described in German Patent Application DE 10 2005 009 467.8 filed on Mar. 2, 2005. This German Patent Application, whose subject matter is incorporated here by reference, provides the basis for a claim of priority of invention under 35 U.S.C. 119(a)-(d).

BACKGROUND OF THE INVENTION

The present invention relates to a handheld power saw having a coupling means for retaining and driving a saw blade and a guide assembly for guiding an oscillating in motion of the saw blade to a handheld power saw having a contact element for bracing the housing on a workpiece and a saw blade, movable in oscillating fashion in a first direction with at least one cutting edge pointing in a working direction, and to a saw blade for a handheld power saw, having an oscillatory drive mechanism and a retention region on which is intended for connection with a coupling means of the handheld power saw.

From British Patent saw blade 2 380 706 A, a handheld power saw with a saw blade that moves in oscillating fashion in a first direction is known. For holding and driving the saw blade, the handheld power saw includes a coupling means, by which the saw blade is connected to a lifting rod, which is driven in linearly oscillating fashion via an eccentric device. An oscillating motion of the saw blade is guided indirectly via a guide assembly for guiding the lifting rod.

SUMMARY OF THE INVENTION

These objects and others, which will be made apparent hereinafter are attained in a handheld power saw, having a coupling means for retaining and driving a saw blade, and having a guide assembly for guiding an oscillating motion of the saw blade.

According to the invention the guide means includes at least one lateral bracing means for shielding the coupling means from shear forces acting on the saw blade. As a result, a secure hold of the coupling means even at major shear forces can be assured, so that in particular it becomes possible to make the handheld power saw usable in a simple, economical way for the use of especially long saw blades, especially blades for back saws. The coupling means is shielded from forces acting on it, so that the coupling means can be designed especially inexpensively. It can also be attained that the saw blade on being installed or secured to the coupling means is guided by the lateral bracing means. Greater comfort can be gained thereby. This last advantage is especially important in self-clamping coupling means, since in that case, because of the guidance properties of the lateral bracing means, blind installation, or installation without visual contact on the part of the user with the coupling means can be achieved.

The term shear forces should be understood in this context to mean forces with a component that is directed both perpendicular to a direction of the oscillating motion of the saw blade and perpendicular to a direction of the cutting edge of the saw blade. Hence shear forces have one component in particular that is perpendicular to a face of the saw blade. In this connection, a bracing means should be understood as a "lateral bracing means", if it is intended to brace the saw blade in a central region of a side face of the saw blade.

Effective shielding from the shear forces can be attained if the bracing means extends over at least 2 cm and even better over 3 to 4 cm, since then a transmission of the shear forces can be avoided by a lever action of the saw blade. Transmission of a bending tension by the bracing means can be avoided if the bracing means prevents sagging of the saw blade in a guide region thereof, so that a bending tension of the saw blade is braced in an entry region of the bracing means.

In a refinement of the invention, it is proposed that the bracing means is embodied as a slide bearing. As a result, an especially economical support of the saw blade with simultaneous shielding of the coupling means can be attained. Slide bearings that include self-lubricating sintered components are especially suitable. In principle, however, embodiments of the invention are also conceivable in which the bracing means is embodied as a needle bearing or roller bearing.

If the bracing means is intended for bracing the saw blade on both sides, then advantageously shear forces can be braced in two opposite directions.

A further gain in comfort upon coupling the saw blade to the handheld power saw can be made possible if the coupling means is embodied as a detent coupling. The detent coupling can especially advantageously be designed as a self-locking detent connection, which acts in a longitudinal direction of the saw blade.

Effective shielding of the coupling means can be attained if the bracing means forms a two-dimensional contact face. As a result, both bending and torsional forces can effectively be shielded against, especially whenever the saw blade in operation is located between two parallel contact faces.

Secure shielding with a sufficiently slight contact pressure of the contact faces can be achieved if the contact face has a length of at least 2 cm in a longitudinal direction of the saw blade. Favorable force ratios can be attained if the length makes up at least half of a width of a saw blade to be fastened in place.

To shield against shear forces, the saw blade, under the influence of such shear forces, advantageously rests laterally in at least two and optionally even three regions of the guide assembly.

Moreover, the invention is based on a handheld power saw, having a housing, having a contact element for bracing the housing on a workpiece, and having a saw blade, movable in oscillating fashion in a first direction, with at least one cutting edge pointing in a working direction.

It proposed that the contact element is supported displaceably relative to the housing. As a result, a contact element that can be adapted flexibly to circumstances can be attained that is simple to displace out of a problematic position in the event of a problem. In particular, flush cutting into a corner is feasible, and the corner may be formed by a work face of the workpiece and by an object protruding from that work face.

The term "displaceably supported" should be understood in this connection to pertain to any component that is movable in a straight line in one or two dimensions.

Flush cutting into a corner with simultaneously good guidance properties of the handheld power saw on the workpiece can be attained if the contact element is displaceable, with a front edge pointing in the working direction, at least as far as a height of the cutting edge. The term "working direction" is understood to mean a direction in which the handheld power saw is moved by a user during a cutting operation.

An at least three-sided, secure bracing of the handheld power saw on the workpiece can be attained if the contact element has a recess that is open in the working direction, or if the contact element embraces the saw blade in the installed state on at least three sides.

An additional gain in comfort can be attained if the handheld power saw includes a spring element for restoring the contact element to a position of repose.

An unintended displacement of the contact element can be avoided if the handheld power saw has a detent element for locking the contact element in a detent position. The detent position can be distinguished especially by the fact that the contact element in the detent position shields the hand of the user, resting on a hand contact face, from the saw blade, thus preventing injuries. To shield two different hand contact faces, the contact element can advantageously be displaced as a function of a hand contact face selected by the user or as a function of a sawing function selected by the user, so that secure protection is always attainable. Sawing functions may for instance be a saber saw function and a backsaw sawing function.

The invention is also based on a saw blade for a handheld power saw, having an oscillatory drive mechanism, and in which the saw blade includes a retention region which is intended for connection with a coupling means of the handheld power saw.

It is proposed that the handheld power saw has a guide region for contact of a lateral bracing means of the handheld power saw. As a result, it can be attained that shear forces on the saw blade in the guide region are braced and cannot burden the coupling means. The coupling means can as a result be designed inexpensively and yet safely.

A light cut involving less expenditure of force can be attained by means of an only slight thickness in the region of a cutting edge of the saw blade. Great rigidity of the guide region can nevertheless be attained if the guide region has a greater thickness of material than a work region with a cutting edge. The guide region can as a result be equipped especially for bracing major rolling forces oriented in a plane of the saw blade or parallel to the working direction.

Breakage of the saw blade at the connecting seam between the guide region and the work region can be reliably avoided if the guide region and the work region are joined by a laser welding process.

Further advantages will become apparent from the ensuing description of the drawings. In the drawings, exemplary embodiments of the invention are shown. The drawings, description and claims include numerous characteristics in combination. One skilled in the art will expediently consider the characteristics individually as well and put them together to make useful further combinations.

DESCRIPTION OF THE PREFERRED EMBODIMENTS

Figure 1:
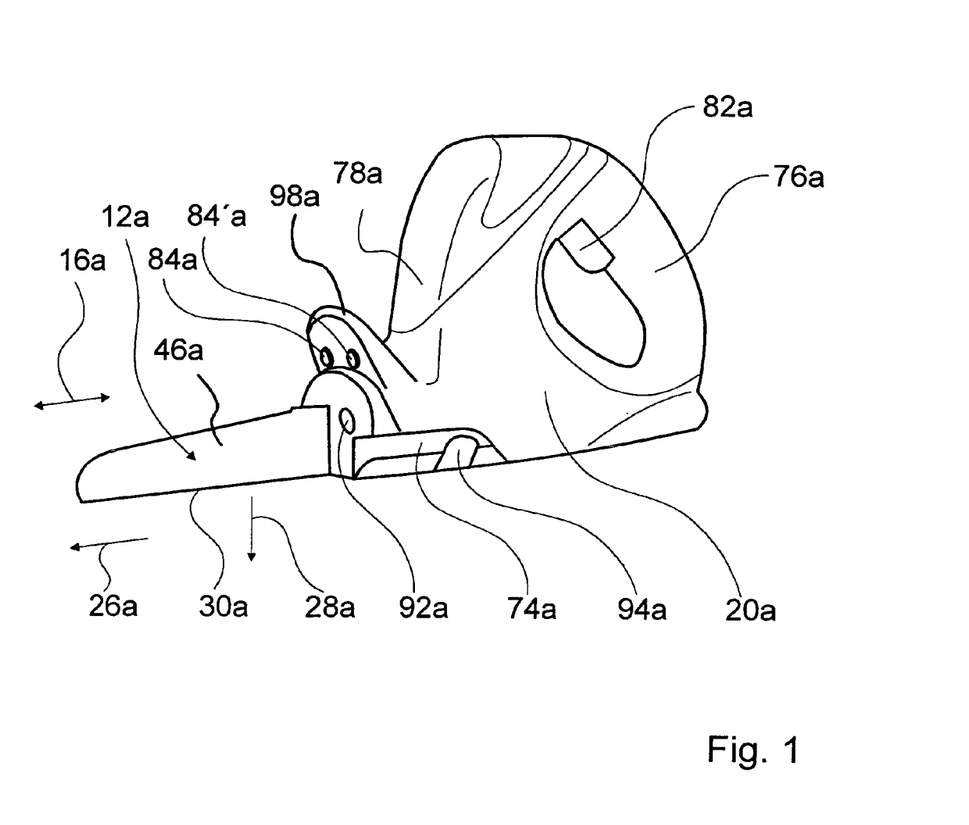
FIG. 1, a handheld power saw with an oscillatingly driven saw blade.
Figure 2:
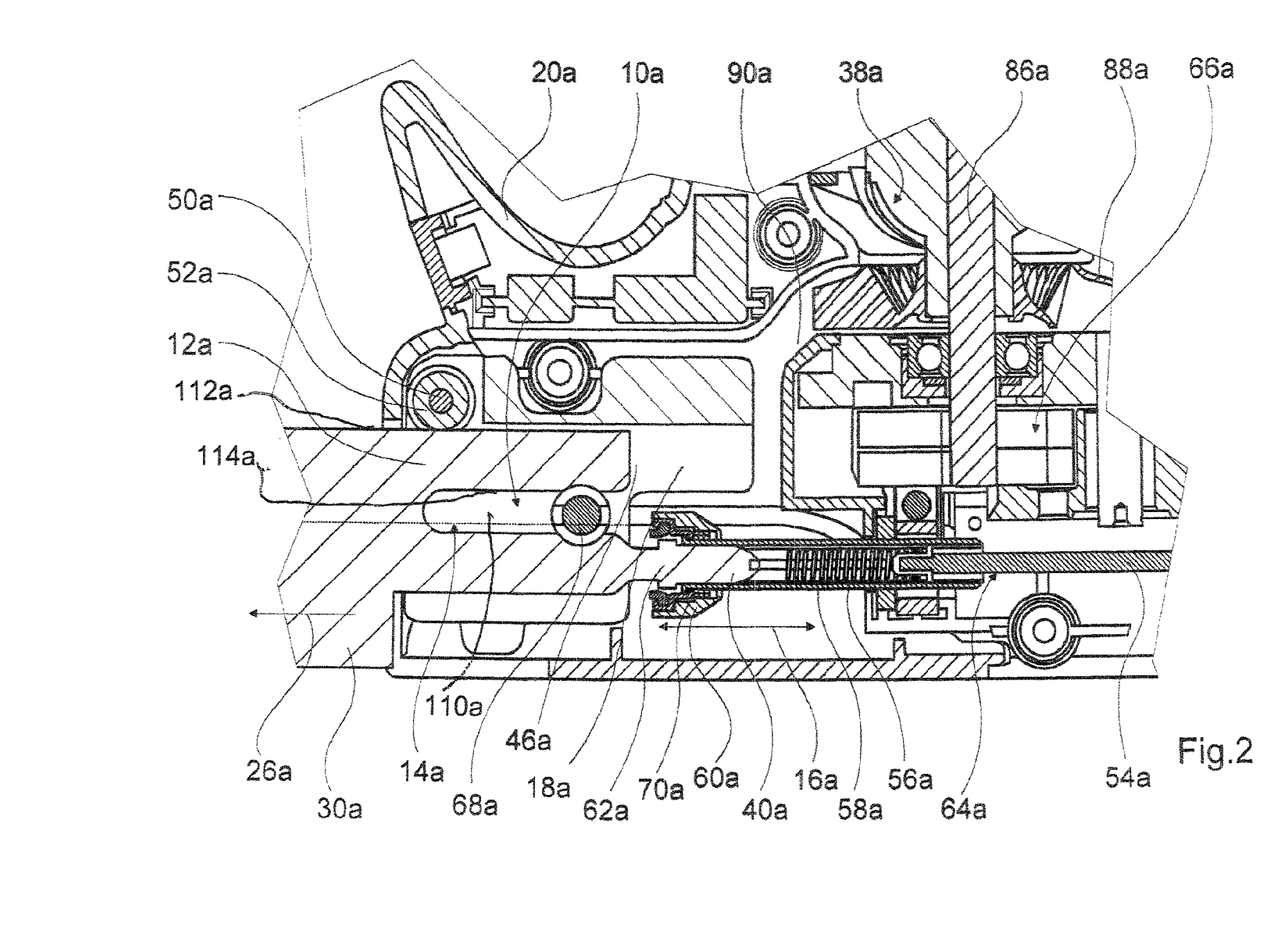
FIG. 2, in longitudinal section, a guide device of the handheld power saw for guiding an oscillating motion of the saw blade.

FIG. 1 shows a handheld power saw, embodied as a back saw with an additional saber saw function, with an oscillatingly driven saw blade 12$a$, which is shown as a representative of a large assortment of saw blades that can be held and driven on the handheld power saw via a coupling means 10$a$ (FIG. 2). A guide assembly 14$a$ for guiding an oscillating motion 16$a$ of the saw blade 12$a$ in one direction 26$a$ is located in a housing 20$a$ of the handheld power saw.

The handheld power saw has two grip regions 76$a$, 78$a$, equipped with a surface with a good grip, specifically a first, D-shaped grip region 76$a$ with a start button 82$a$ and a second, front grip region 78$a$ above the saw blade 12$a$. The start button 82$a$ is located on a grip bar of the first grip region 76$a$, inclined by approximately 45° to the direction 26$a$. To prevent the user's hand from slipping off the second grip region 78$a$ unintentionally in a region of the saw blade 12$a$, the housing 20$a$ has a hornlike protrusion 98$a$, in which a circuit board is located for wiring two light-emitting diodes 84$a$, 84$a'$ that are located in the protrusion 98$a$ and illuminate the saw blade 12$a$.

Figure 7:
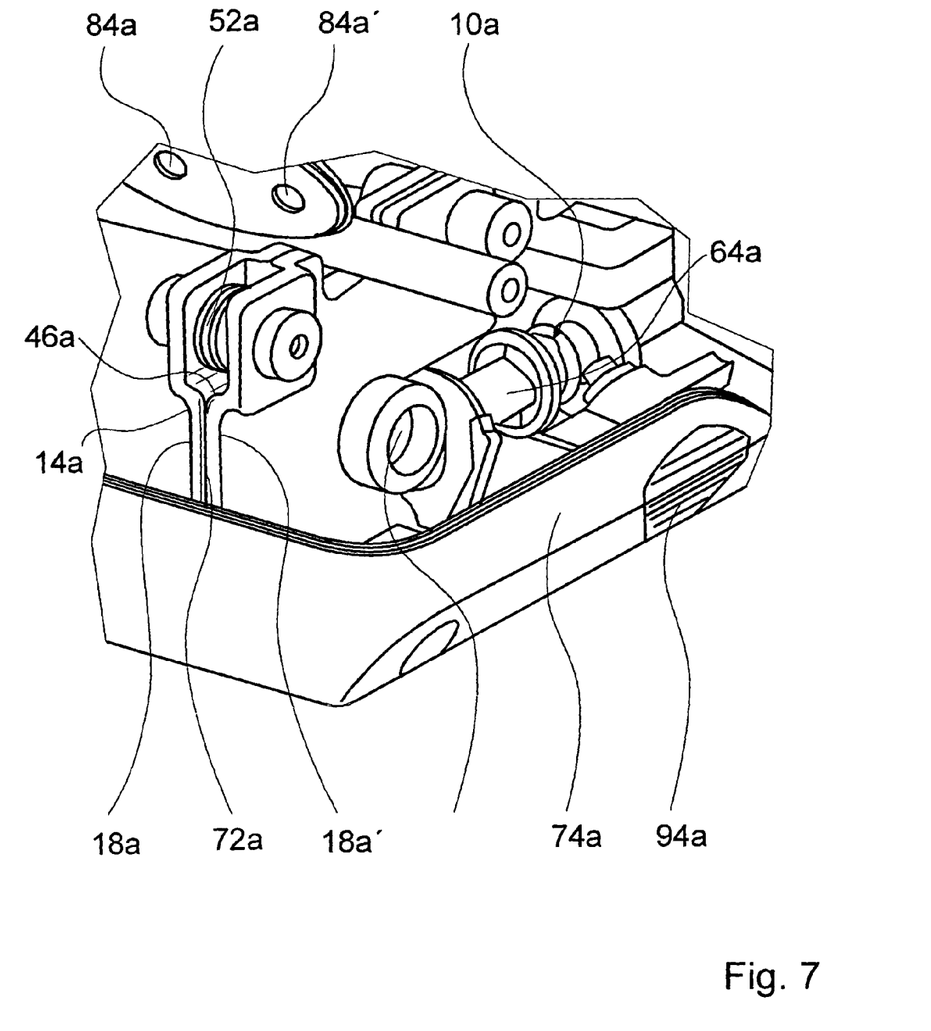
FIG. 7, an inside view of a coupling means of the handheld power saw with the actuation slide of FIG. 6.

The guide assembly 14$a$ includes a pressure roller 52$a$, supported in sliding fashion on a bolt 50$a$, and a pressure bolt 68$a$ for guiding the saw blade 12$a$ in the direction 26$a$ of the oscillating motion 16$a$ of the saw blade 12$a$, which corresponds to a longitudinal direction of the saw blade 12$a$. The pressure bolt 68$a$ extends through a longitudinally extending recess 110$a$ in a guide region 42$a$ of the saw blade 12$a$ and bears on an edge 114$a$ of he saw blade 12$a$ in the recess 110$a$ when the saw blade 12$a$ is driven in its oscillating motion 16$a$. The pressure roller 52$a$ is arranged to bear on an edge 112$a$ of the saw blade 12$a$ in the guide region 42$a$,which is located on a side of the saw blade 12$a$ that is opposite to the side on which a cutting edge 30$a$ is arranged (FIG.7).

The guide assembly 14$a$ also includes two bracing means 18$a$, which in the installed state of the saw blade 12$a$ are located mirror-symmetrically beside the saw blade 12$a$ when the saw blade 12$a$ is driven in its oscillating motion. The bracing means 18$a$ are provided for guiding the saw blade 12$a$ in a plane of the saw blade 12$a$ and for shielding the coupling means 10$a$ of the handheld power saw from shear forces acting on the saw blade 12$a$ perpendicular to its two-dimensional extent.

The coupling means 10$a$ serves to connect the saw blade 12$a$ to a lifting rod 64$a$, which is driven to oscillate linearly, via an eccentric device 66$a$, by a drive mechanism 38$a$ of the handheld power saw, the drive mechanism being embodied as an electric motor.

The lifting rod 64$a$ has a first, flat part 54$a$ and a second, tubular part 58$a$, which is supported resiliently on the first part 54$a$ in the direction 26$a$ via a spring 56$a$. The first part 54$a$ has an oval recess, not shown here, which is engaged by an eccentric pin (not shown) of the eccentric device 66$a$ via a bearing (not shown). The coupling means 10$a$ is located on a front end of the second part 58$a$.

The coupling means 10$a$ includes a clamping sleeve 60$a$, with a slotlike opening, not shown here, into which upon assembly a T-shaped extension 62$a$ of a retaining region 40$a$ of the saw blade 12$a$ is inserted. Twisting the clamping sleeve 60$a$ causes it to engage a crossbeam of the extension 62$a$ from behind, thus fixing the saw blade 12$a$ axially on the lifting rod 64$a$. The twisting of the clamping sleeve 60$a$ is effected automatically by a restoring spring 70$a$, so that the coupling means 10$a$ is embodied as a detent coupling. For automatic twisting of the clamping sleeve 60$a$ upon insertion of the extension 62*a*, the clamping sleeve 60*a* may have an oblique sliding face (not shown). The coupling means 10*a* is suitable for receiving known saber saw blades with an end region, toward the fastening side, that is analogous to the extension 62*a*.

Figure 6:
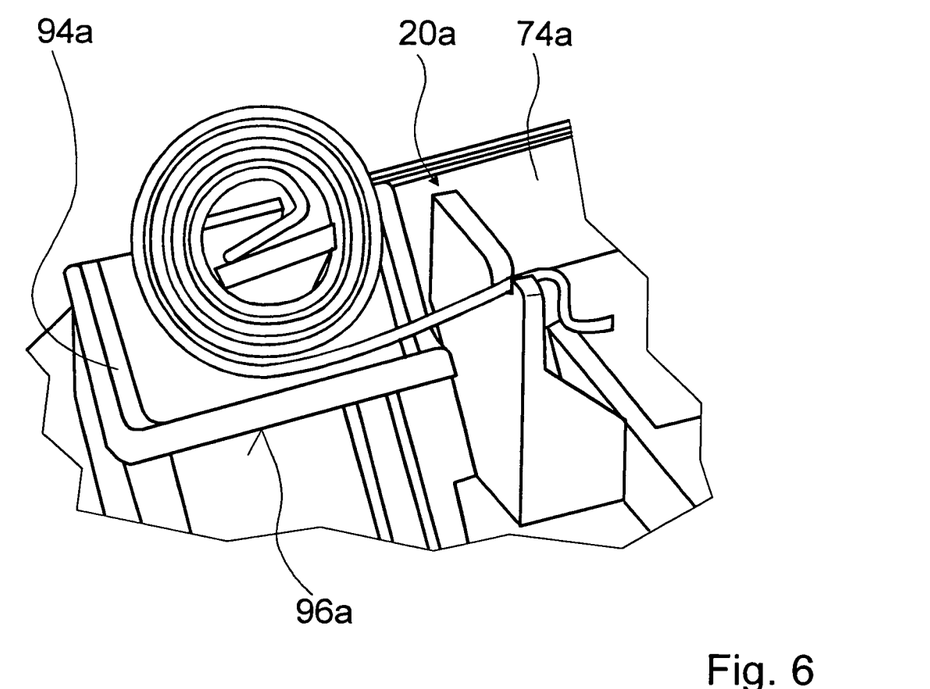
FIG. 6, in an inside view, an actuation slide for releasing the saw blade of the handheld power saw.

For releasing the coupling means 10*a*, the handheld power saw includes a slide 94*a*, which is resiliently and displaceably connected to the housing 20*a* and which has a pressure edge 96*a* that protrudes into the housing 20*a* and that by a displacement of the slide 94*a* in each reciprocating position of the lifting rod 64*a* can be brought into contact (FIGS. 6 and 7) with a finlike engagement element, not shown here, of the clamping sleeve 60*a*.

A stroke of the handheld power saw or of the oscillating motion 16*a* is 23 mm long. As a result, the clamping sleeve 60*a* can be rotated by 90°, so that its slotlike opening extends parallel to the saw blade 12*a*, and the saw blade 12*a* can be removed from the coupling means 10*a* by the user.

The housing 20*a* has a transparent region 74*a* all around the coupling means 10*a* that allows visual monitoring of locking of the saw blade 12*a* in the coupling means 10*a*.

An air flow from a fan wheel 88*a*, which is secured to an armature shaft 86*a* of the drive mechanism 38*a*, is guided by an air conduit 90*a* through the transparent region 74*a* and emerges from the housing 20*a* through lateral openings 92*a* located next to the saw blade 12*a*. As a result, chips are prevented from penetrating into the region 74*a*, and chips are blown out of a work region.

The lateral bracing means 18*a*, 18*a*' (FIGS. 3 and 4) are intended for bracing the shear forces on both sides and are made from graphite-containing, lubricant-filled sintered bronze. The bracing means 18*a*, 18*a*' therefore form a slide bearing for displaceably supporting the saw blade 12*a* in the plane defined by the saw blade 12*a*. By means of a rounded area 72*a* in a front region of both bracing means 18*a*, 18*a*', the bracing means 18*a*, 18*a*' simultaneously guide an insertion motion of the saw blade 12*a*.

Figure 3:
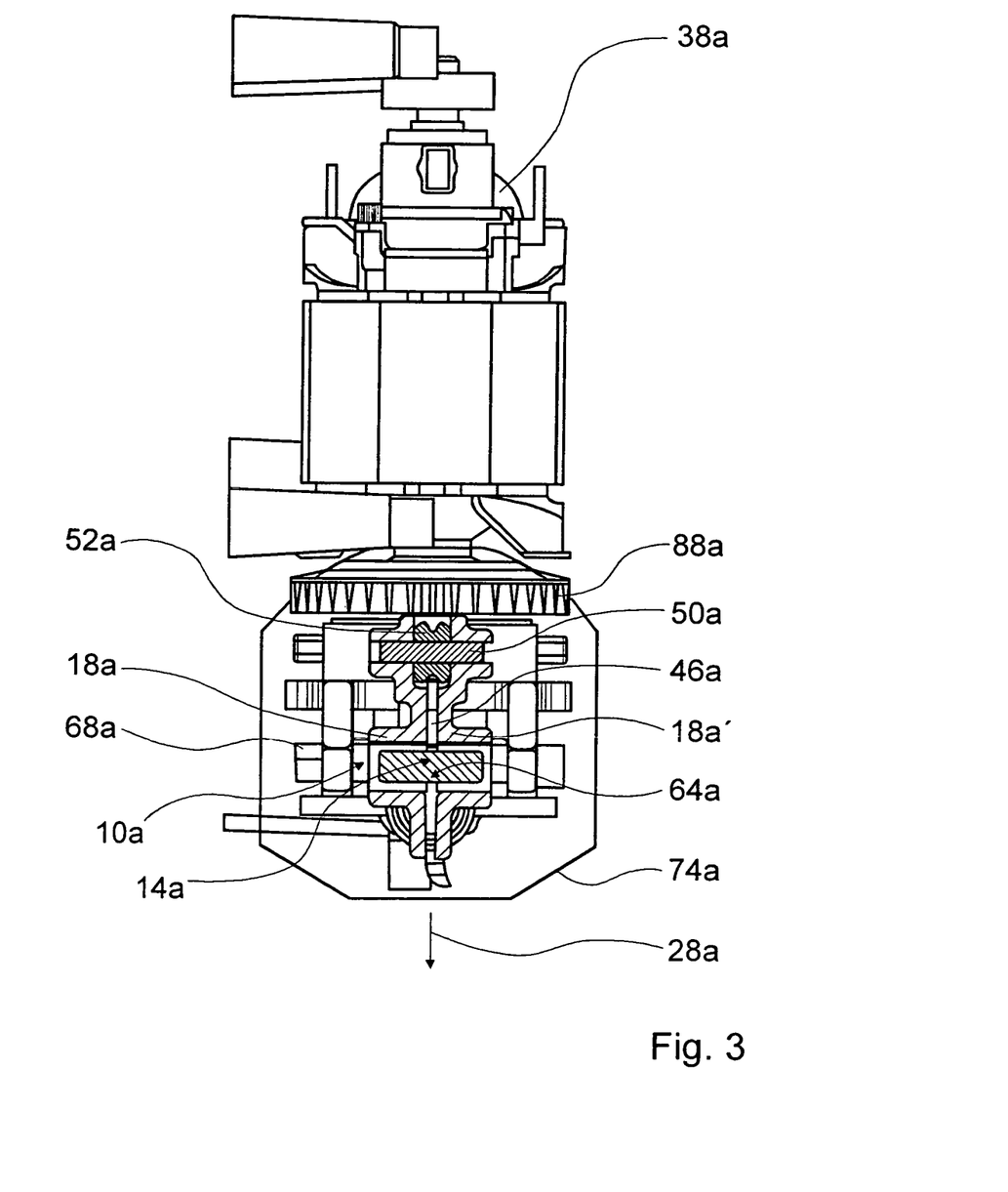
FIG. 3, in cross section, the guide device of FIG. 2.
Figure 4:
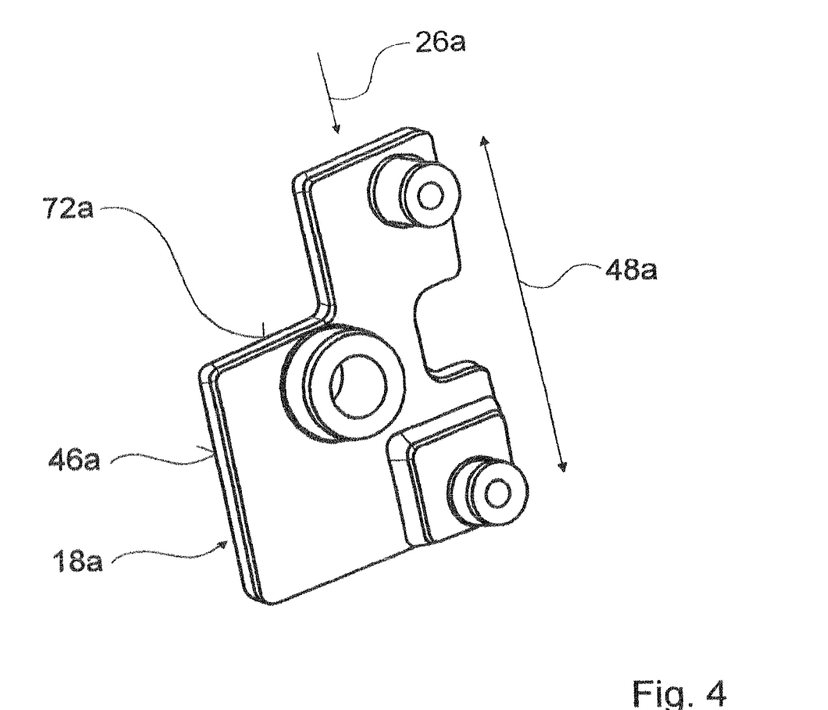
FIG. 4, a lateral bracing means of the guide device from FIGS. 2 and 3.

The bracing means 18*a* and the bracing means 18*a*' mirror-symmetrical to it each form a two-dimensional contact face 46*a* for the saw blade 12*a*, with a length 48*a* of 3 cm in the direction 26*a*. The contact faces 46*a* stiffen the saw blade 12*a* in a guide region 42*a*, located between the retaining region 40*a* and a work region 44*a* that is equipped with a cutting edge 30*a*, and they brace against shear forces acting on the work region 44*a* so that these forces cannot be transmitted into the retaining region 40*a* and thus to the coupling means 10*a*. The cutting edge 30*a* has crossed toothing.

Figure 5:
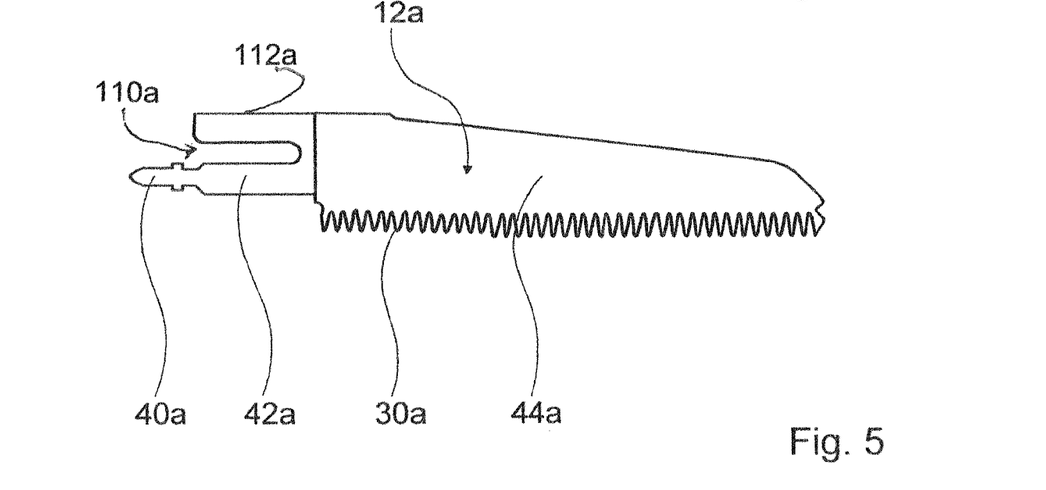
FIG. 5, a saw blade of the handheld power saw of FIGS. 1-4.

The saw blade 12*a* shown in FIG. 5 has the retaining region 40*a*, the guide region 42*a*, and the work region 44*a*. The retaining region 40*a* and the guide region 42*a* have a material thickness of 1.2 mm, while the work region 44*a* has a material thickness of 0.9 mm. The guide region 42*a* is stamped together with the retaining region 40*a* out of a steel sheet, while the work region 44*a* is joined to the guide region 42*a* by a laser welding process. The coupling means 10*a*, however, is also suitable for holding saw blades of constant material thickness throughout.

Figure 8:
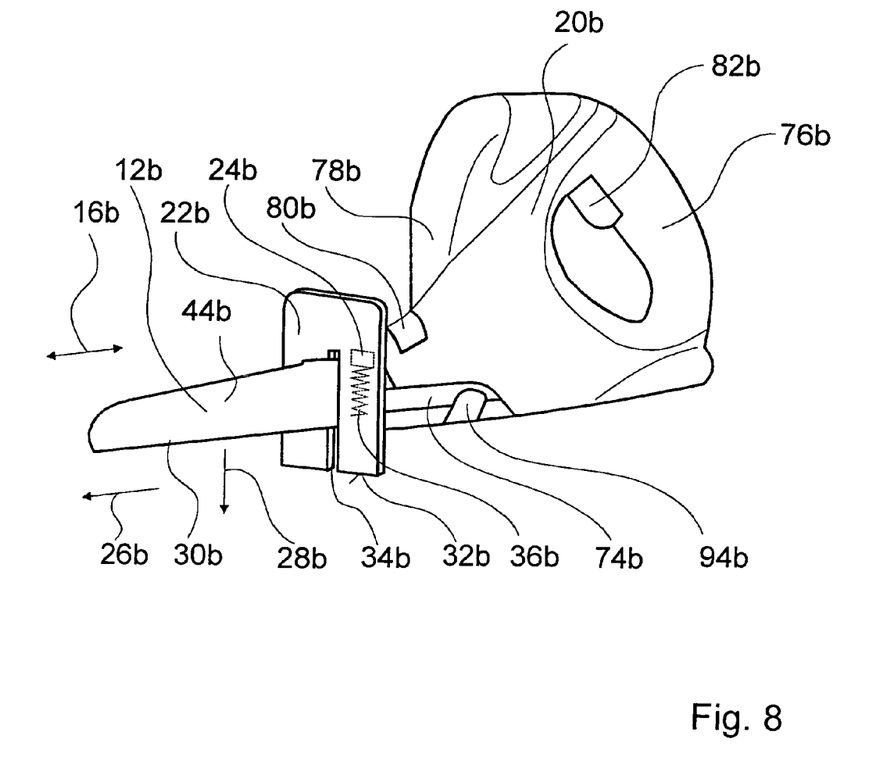
FIG. 8, an alternative handheld power saw, having a housing and having a contact element for bracing the housing.

FIG. 8 shows a handheld power saw in a second embodiment of the invention. In the description, it will essentially be the differences from the exemplary embodiment shown in FIGS. 1-7 that are addressed, while for characteristics that remain the same, reference is made to the description of the exemplary embodiment of FIGS. 1-7. Analogous characteristics are identified by the same reference numerals, but to distinguish between the exemplary embodiments the letters "a" and "b" are added.

The handheld power saw shown in FIG. 8 includes a housing 20*b*, with a contact element 22*b*, supported displaceably relative to the housing 20*b*, for bracing the housing 20*b* on a workpiece. The contact element 22*b* is supported on a rail, not shown here, and is displaceable, with a front edge 32*b* pointing in the working direction 28*b*, as far as the height of a cutting edge 30*b* of an oscillatingly movable saw blade 12*b*. The saw blade 12*b*, in the installed state, reaches through a central, slotlike recess 34*b* of the contact element 22*b*, which recess is open in the working direction 28*b*.

A spring element 36*b* automatically restores the contact element 22*b* to a position of repose, shown in FIG. 8, in which a user's hand, resting on a lower, transparent region 74*b*, is shielded from the saw blade 12*b* by the contact element 22*b*. The position of repose is at the same time a detent position, in which the contact element 22*b* automatically locks by means of a detent element 24*b*.

If a user wants to saw flush against a corner with the cutting edge 30*b*, he can release the detent element 24*b*, by an unlocking means 80*b* located on a second grip region 78*b*, so that the contact element 22*b* can be deflected out of its position of repose, counter to the working direction 28*b* and counter to the force of the spring element 36*b*, when the front edge 32*b* strikes the corner. The contact element 22*b* then shields a user's hand resting in the second grip region 78*b*.

The invention claimed is:

1. A handheld power saw, comprising
 a housing;
 a lifting rod in said housing;
 a drive mechanism in said housing, said drive mechanism being connected with said lifting rod so that said lifting rod is drivable by said drive mechanism to oscillate linearly;
 a saw blade extending in a longitudinal direction, connected with said lifting rod and movable in an oscillating motion in said longitudinal direction, wherein said saw blade is provided with a longitudinally extending, open-ended recess in a guide region of said saw blade, said guide region inserted in said housing, and said saw blade having a retaining region protruding from said guide region of said saw blade and a T-shaped extension of said retaining region;
 coupling means for retaining and driving said saw blade, wherein said coupling means is located on a front end of said lifting rod and includes a clamping sleeve and said T-shaped extension of said saw blade is inserted into said clamping sleeve and clamped thereby, whereby said saw is blade is connected to said lifting rod and drivable by said drive mechanism via said lifting rod;
 a guide assembly for guiding said oscillating motion of said saw blade when said saw blade is connected with said lifting rod, said guide assembly comprising:
  two lateral bracing means arranged in front of the clamping sleeve and on opposite sides of said saw blade when said saw blade is connected to said lifting rod, said two lateral bracing means being configured to shield said coupling means from shear forces acting on said saw blade;
  a pressure roller supported in a sliding fashion on a bolt; and
  a pressure bolt;
 wherein said pressure roller is arranged to bear on an edge of said saw blade on an opposite side of said saw blade from a cutting edge thereof when said saw blade is connected with said lifting rod, whereby said pressure roller guides said saw blade in said oscillating motion in the longitudinal direction; and wherein said pressure bolt is arranged in said longitudinally extending recess of said saw blade so as to bear on an edge of said saw blade in said longitudinally extending recess and directly guide said saw blade in said oscillating motion when said saw blade is connected with and driven by said drive mechanism via said lifting rod.

2. The handheld power saw as defined by claim 1, wherein the coupling means is configured as a detent coupling.

3. A handheld power saw as defined in claim 1, wherein said housing has a contact element for bracing the housing on a workpiece and said saw blade has at least one cutting edge pointing in a working direction, wherein the contact element is supported displaceably relative to the housing.

4. The handheld power saw as defined by claim 3, wherein the contact element is displaceable, with a front edge pointing in the working direction, at least as far as a height of the cutting edge.

5. The handheld power saw as defined by claim 3, wherein the contact element has a recess that is open in the working direction.

6. The handheld power saw as defined by claim 3, further comprising a spring element for restoring the contact element to a position of repose.

7. The handheld power saw as defined by claim 3, further comprising a detent element for locking the contact element in a detent position.

8. The handheld power saw as defined by claim 1, wherein said two lateral bracing means each form a respective two-dimensional contact face for the saw blade.

9. The handheld power saw as defined by claim 1, wherein said two lateral bracing means are composed of graphite-containing, lubricant-filled sintered bronze.

10. A handheld power saw, comprising
a housing;
a lifting rod in said housing;
a drive mechanism in said housing, said drive mechanism being connected with said lifting rod so that said lifting rod is drivable by said drive mechanism to oscillate linearly;
a saw blade connected with said lifting rod and movable in an oscillating motion, wherein said saw blade has an end part with an outer surface, an open-ended recess extending from a rear end forwardly and having an inner surface, and a T-shaped extension extending from said rear end rearwardly;
coupling means for retaining and driving said saw blade and for connecting said saw blade with said lifting rod, wherein said coupling means include a clamping sleeve into which said T-shaped extension of said saw blade is inserted and clamped thereby;
a guide assembly for guiding said oscillating motion of said saw blade, said guide assembly comprising:
at least one lateral bracing means located along a direction of said oscillating motion in front of said clamping sleeve and shielding said clamping sleeve of said coupling means from shear forces acting on said saw blade when said saw blade is connected to said lifting rod;
a pressure roller supported in a sliding fashion on a bolt and arranged to bear on said outer surface of said saw blade when said saw blade is connected to said lifting rod in order to guide said saw blade in a direction of said oscillating motion; and
a pressure bolt located in said recess of said saw blade so as to bear on said inner surface of said recess to directly guide said saw blade in said direction of said oscillating motion when said saw blade is connected to said lifting rod.

11. The handheld power saw as defined by claim 10, wherein said at least one lateral bracing means consists of two bracing means arranged on opposite sides of said saw blade when said saw blade is connected with said lifting rod, wherein each of said two bracing means forms a respective two-dimensional contact face for the saw blade.

12. The handheld power saw as defined by claim 10, wherein said at least one lateral bracing means is composed of graphite-containing, lubricant-filled sintered bronze.

* * * * *